A. J. HERSEY.
VEHICLE FENDER.
APPLICATION FILED MAR. 5, 1921.

1,382,911. Patented June 28, 1921.

Inventor
Arthur J Hersey.
Geo Stevens
Attorney

UNITED STATES PATENT OFFICE.

ARTHUR J. HERSEY, OF MINNEAPOLIS, MINNESOTA.

VEHICLE-FENDER.

1,382,911.  Specification of Letters Patent.  Patented June 28, 1921.

Application filed March 5, 1921. Serial No. 449,770.

*To all whom it may concern:*

Be it known that I, ARTHUR J. HERSEY, a citizen of the United States, residing at Minneapolis, in the county of Hennepin and State of Minnesota, have invented certain new and useful Improvements in Vehicle-Fenders, of which the following is a specification, reference being had therein to the accompanying drawing.

This invention relates to fenders for automobiles and has special reference to fenders which are used to extend outwardly from the forward and rear ends of a car.

The principal object of the invention is to provide a fender that will do as little damage as possible to anything which it may accidentally engage and one that will receive the minimum of damage itself by such engagement.

Other objects and advantages of the peculiar construction of fender will appear in the further description of the invention.

Referring to the accompanying drawing forming part of this application and in which like reference characters indicate like parts—

Figure 1:
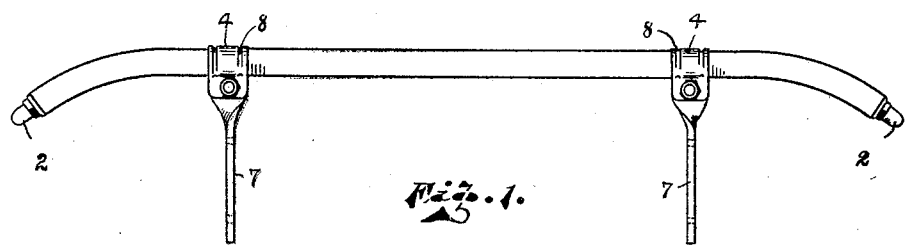
Figure 1 is a top plan view of one of the improved fenders.
Figure 2:
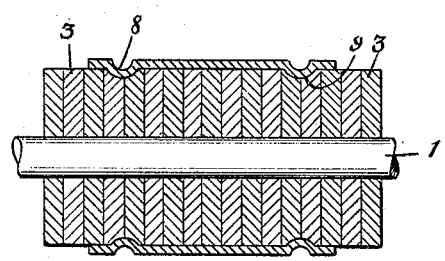
Fig. 2 is an enlarged vertical sectional view through one of the attaching ferrules which hold the fender to the car.
Figure 3:
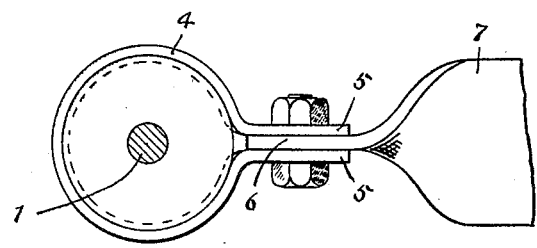
Fig. 3 is a transverse sectional view through the fender adjacent one of the holding ferrules showing the latter in elevation.
Figure 4:
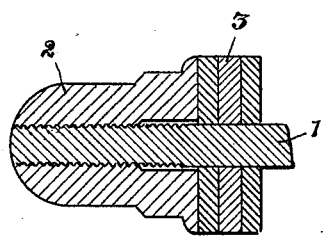
Fig. 4 is a vertical sectional view of one of the end thimbles of the fender.

1 represents the core of the fender which preferably comprises a round metal rod, the main body portion of which is straight with the ends bent slightly backwardly toward the car as is common in such devices, the extreme ends of which are screw threaded and provided with gracefully shaped metal screw threaded tips 2. The entire core 1 is covered with a plurality of rubber washer like disks 3, they being placed upon the core, one tightly against the other, and when the core is thus entirely covered the tips 2 are screwed up tightly in place for holding the rubber washers in place.

In the construction of this fender it is the aim to make use of what would otherwise become waste material, principally in the form of inner tubes or the like.

The attaching clips 4 are made to surround the body portion of the completed fender and pivotally hold intermediate of their spaced ends 5 the flat end 6 of the holding bracket 7 which is bolted in the usual manner to the frame or other convenient portion of the automobile not shown. The cylindrical portion of the clips 4 have formed adjacent the ends thereof annular depressions or grooves 8 which result in a correspondingly inwardly projecting annular rib 9 for the purpose of more forcibly impinging the circumferential surface of the rubber covering of the fender than the main body portion of the clip. This results in the clips becoming positioned upon the fender without being indented therein which would spoil the general appearance of the attachment besides tending to bulge the rubber at each end of the clip.

From the foregoing it is evident that I have produced a soft surfaced resilient fender, which, while quite yieldable to a certain extent, will retain its normal position and readily rebound when forcibly engaged.

Having thus described my invention, what I claim and desire to secure by Letters Patent, is:

1. A fender of the character described comprising a rigid core, a plurality of washer-like rubber disks mounted upon the core and forming a covering therefor, and means for holding said disks tightly together upon the core.

2. A fender of the class described comprising in combination a metal core, a plurality of washer-like rubber disks mounted upon the core and held tightly together thereupon by tips screw threadedly mounted upon the ends of the core.

3. The combination with a fender of the class described comprising a metal core and a rubber covering, of holding clips having annular ribs upon the inside thereof for embedment within the covering of the fender when fastened thereabout, substantially as and for the purpose described.

4. The combination with a fender of the class described comprising a metal core and rubber covering, of holding clips surrounding the fender outside of the covering whereby to permit of the core of the fender universally yielding without becoming disengaged from the holder.

In testimony whereof I hereunto affix my signature in the presence of two witnesses.

ARTHUR J. HERSEY.

Witnesses:
S. C. BRONSON,
S. GEO. STEVENS.